(12) United States Patent
Wang et al.

(10) Patent No.: US 7,693,211 B2
(45) Date of Patent: Apr. 6, 2010

(54) FAST FOURIER TRANSFORM BASED PHASE LOCKED LOOP FOR NAVIGATIONAL RECEIVERS

(75) Inventors: Chi-Shin Wang, Half Moon Bay, CA (US); Yue Meng Chen, Shanghai (CN); Zhike Jia, San Jose, CA (US)

(73) Assignee: SIRF Technology Holdings, Inc., San Jose, CA (US)

( * ) Notice: Subject to any disclaimer, the term of this patent is extended or adjusted under 35 U.S.C. 154(b) by 1021 days.

(21) Appl. No.: 11/379,451

(22) Filed: Apr. 20, 2006

(65) Prior Publication Data

US 2007/0248152 A1 Oct. 25, 2007

(51) Int. Cl.
*H04B 1/00* (2006.01)
(52) U.S. Cl. ..................................... 375/150
(58) Field of Classification Search ................. 375/150
See application file for complete search history.

(56) References Cited

U.S. PATENT DOCUMENTS

| | | | |
|---|---|---|---|
| 5,271,034 A * | 12/1993 | Abaunza | ..................... 375/150 |
| 6,163,276 A | 12/2000 | Russell | |
| 6,181,258 B1 | 1/2001 | Summers | |
| 6,392,590 B1 | 5/2002 | Kagemoto | |
| 6,611,756 B1 | 8/2003 | Chen | |
| 6,850,557 B1 * | 2/2005 | Gronemeyer | ................ 375/150 |
| 7,545,894 B2 * | 6/2009 | Ziedan et al. | ................ 375/347 |
| 2005/0043887 A1 | 2/2005 | Chenus | |
| 2005/0063487 A1 | 3/2005 | Sayegh | |

* cited by examiner

*Primary Examiner*—David C Payne
*Assistant Examiner*—Nader Bolourchi
(74) *Attorney, Agent, or Firm*—Mark J. Danielson; Pillsbury Winthrop Shaw Pittman LLP

(57) ABSTRACT

Fast Fourier Transform (FFT) based Phase Lock Loops (PLLs) are provided for use in navigational signal receivers. In an embodiment, a navigation receiver correlates a received navigational signal with a locally generated signal into correlation samples, e.g., one-millisecond correlation samples. The navigation receiver includes a FFT based PLL that corrects phase shifts in the correlation samples due to the Doppler frequency by considering both the Doppler frequency and its rate of change, which are obtained from a FFT computation with interpolation. The phase corrected correlation samples are then integrated over a length of a navigation data bit, e.g., 20 milliseconds, to determine the sign of the data bit of the received signal. In another embodiment, a soft decision feedback technique involving integration extending over the present data bit and several prior data bits is used to determine the sign of a present data bit of the received signal.

24 Claims, 4 Drawing Sheets

BLOCK DIAGRAM OF THE FFT BASED COHERENT PLL TRACKING LOOP

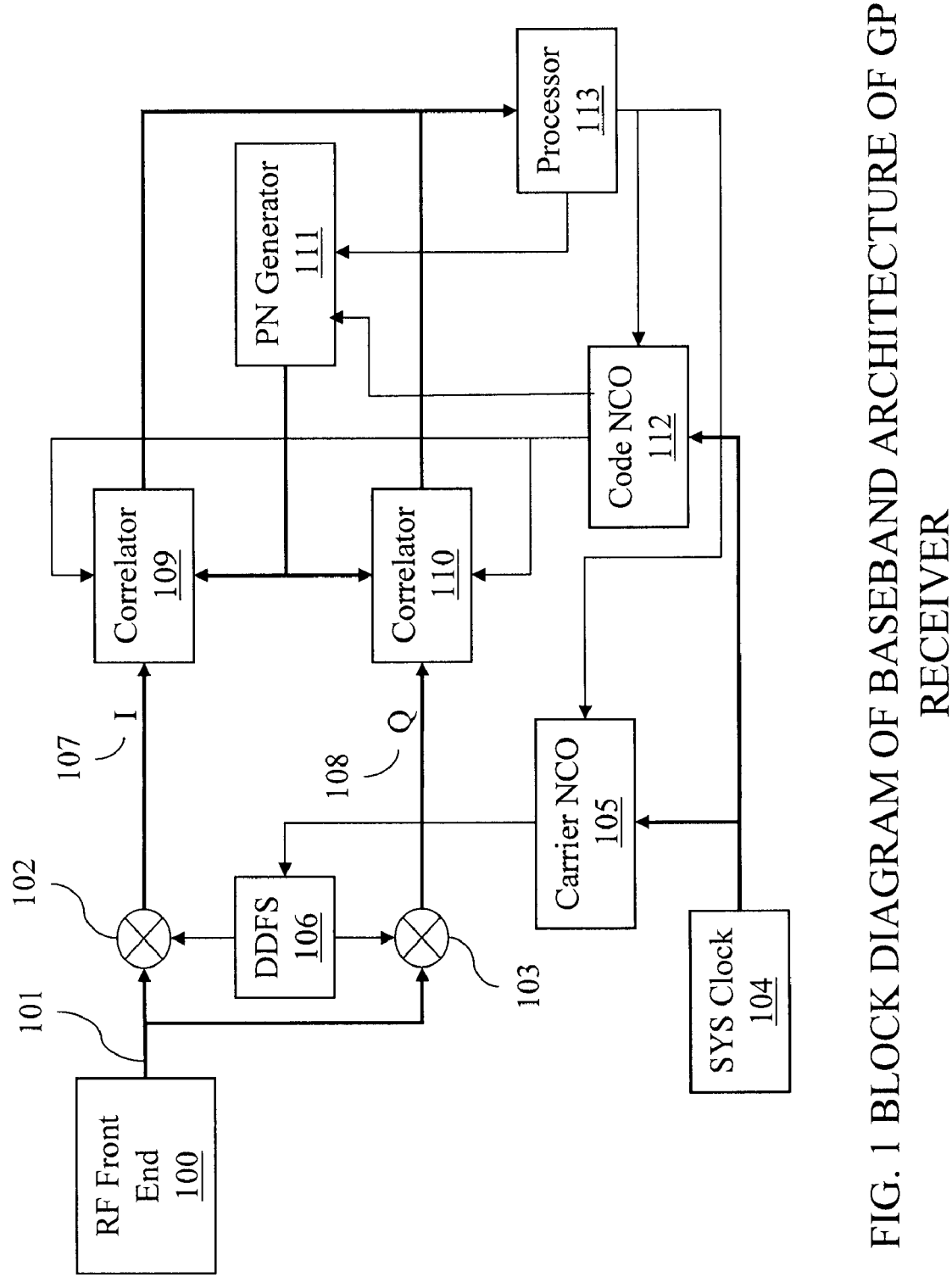
FIG. 1 BLOCK DIAGRAM OF BASEBAND ARCHITECTURE OF GPS RECEIVER

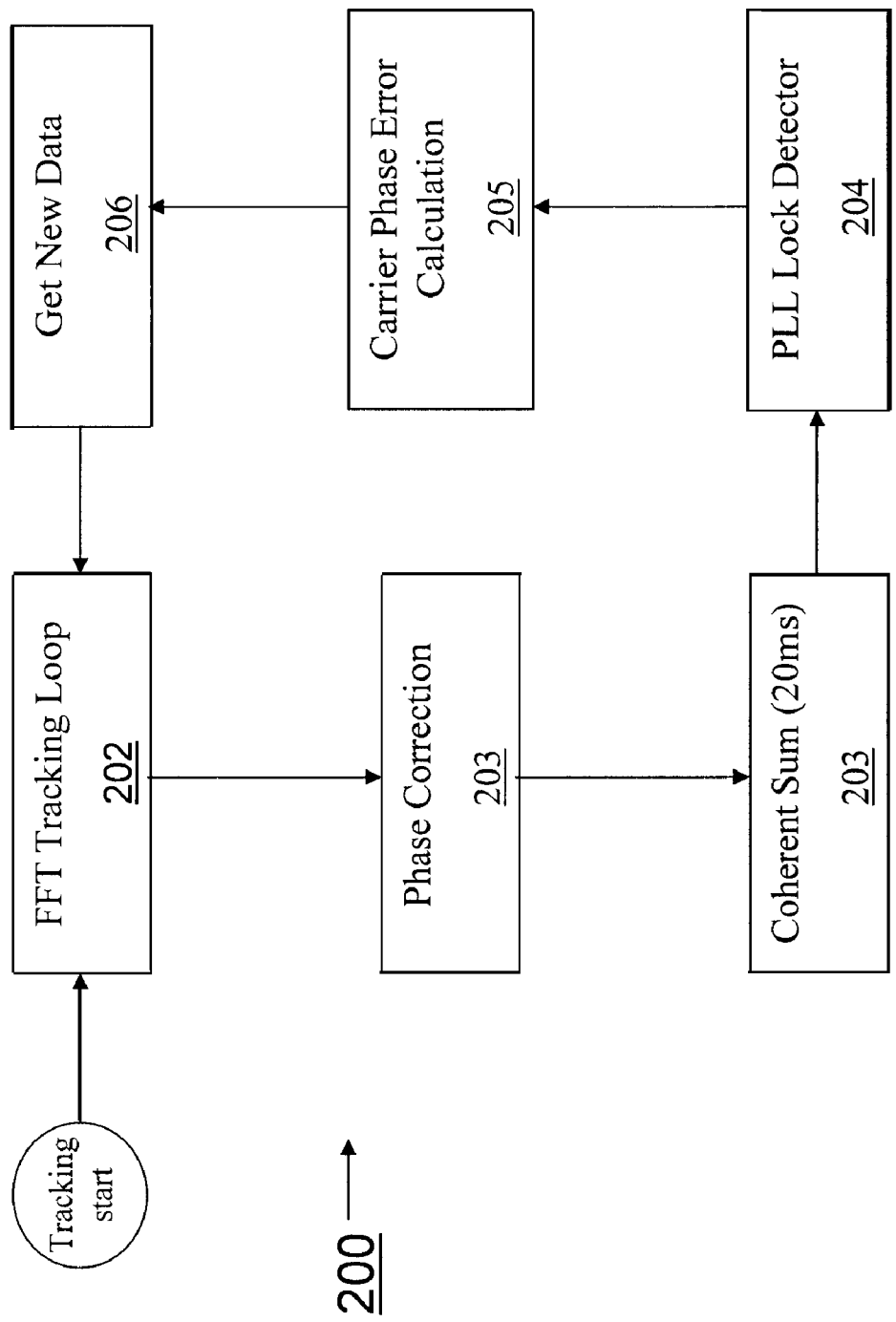
FIG. 2 BLOCK DIAGRAM OF THE FFT BASED COHERENT PLL TRACKING LOOP

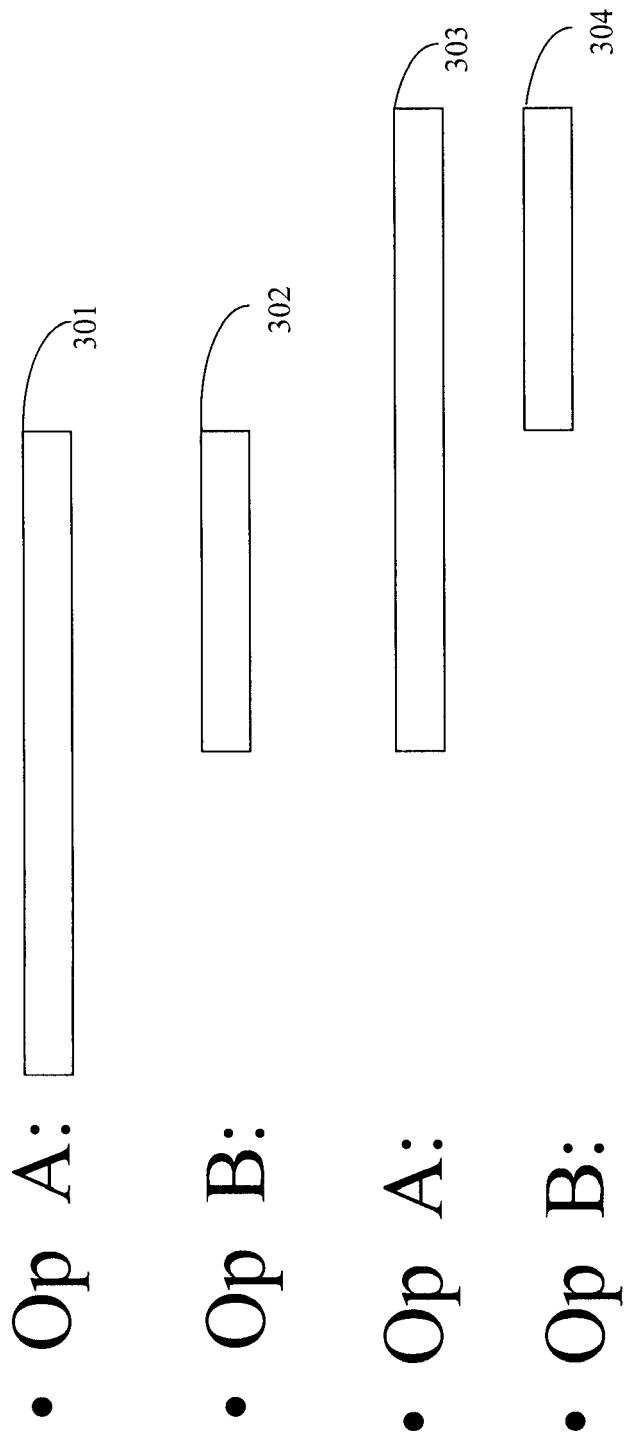

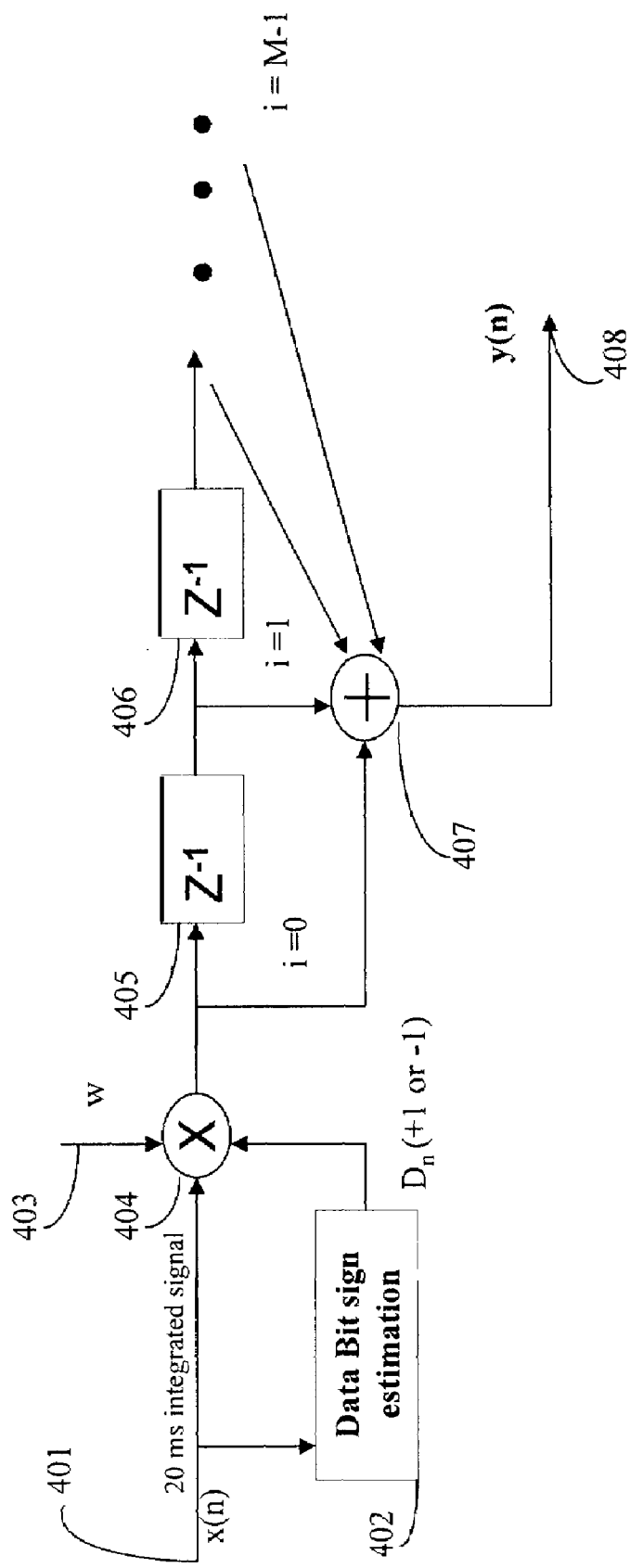
FIG. 4 THE SOFT DECISION FEEDBACK WITH MOVING WINDOW

FAST FOURIER TRANSFORM BASED PHASE LOCKED LOOP FOR NAVIGATIONAL RECEIVERS

FIELD OF THE INVENTION

The present invention relates generally to navigational signal receivers, and more particularly to the use of fast Fourier transform based phase lock loops in navigational receivers.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. But more than twenty-four satellites may be present as additional spares. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using simultaneously received signals from a sufficient number of satellites, a GPS receiver can calculate its position, velocity, altitude, and time. The Russian government operated GLONASS and European Union proposed GALILEO are two other important satellite navigation systems.

The GPS receivers can operate in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock on to those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and corresponding start mode is known as "warm start."

The GPS receiver has to acquire and lock on to at least four satellites in order to derive the position, velocity and time. Usually, a GPS receiver has many parallel channels, each receiving signals from a separate visible GPS satellite. The acquisition of the satellite signals involves a two-dimensional search of frequency and the PRN code phase. Each satellite transmits a unique PRN code, which repeats every millisecond. The receiver locally generates a replica frequency and a replica code phase and correlates these with the received satellite signals. The PRN code has to be searched in at least 2046 phases and the frequency search depends upon the Doppler frequency due to relative motion between the satellite and the receiver. Additional frequency variation may result due to local oscillator instability.

When the satellite signal is strong the receiver can detect the presence of a satellite signal in a short time. But when the signal is weak a long signal correlation is needed and the integration or correlation needs to be coherent which requires large computation load. The signals may be weak due to an obstruction by foliage or buildings, or indoor operation. Special techniques are required to acquire the signal under these weak signal power conditions. One of the more widely used techniques under these conditions is known as assisted GPS (AGPS). This technique is used with GPS receivers in cell phones. In this method a cellular base station or server provides the ephemeris, time and data bit edge position to the GPS receiver in the cell phone so that it may acquire the satellite signal. This technique requires synchronization with the base station or server, and the service has to be provided by the cell phone operator. Consequently, it results in extra subscription charges and base station augmentation.

Due to the disadvantages with AGPS, it is desirable to be able to acquire weak GPS signals without outside assistance. Examples of this approach are disclosed in U.S. Pat. Nos. 5,271,034, 6,392,590, and 6,611,756. Most of the techniques described in these patents are not suitable when the received signal is extremely weak. This is because of the large computation involved in carrying out lengthy signal integrations and Fast Fourier Transforms (FFTs). In these techniques, the integration involves the summing of one-millisecond correlation values. A correlation value is obtained by comparing the samples of input signal with locally available PRN code samples over a one-millisecond interval under synchronized condition. The difference between the agreement and disagreement of the samples is this correlation value. In the case of perfect correlation and no presence of noise, the correlation value is equal to the number of samples in the one millisecond length, e.g., if the number of samples per code-length in one millisecond is 2046, then the perfect correlation value is 2046. But if the codes are not aligned this value may be −130 or +126 for 25% of the time or −2 for the remaining 75% of the time. Thus, in this case the detection of the received signal can be determined easily. In the presence of noise, however, the correct correlation value may not be 2046, but may have a lower value, and further when the signal is extremely weak it may not be able to determine the correct correlation. Under these circumstances, the receiver can estimate the correlation value over several consecutive milliseconds to arrive at a reasonable value. This summing up over several milliseconds is also known as coherent integration. The coherent integration requires that there are no sample reversals due to the residual carrier frequency. If there are reversals due to carrier frequency, the correlations may be carried out over non-reversed parts of the sample lengths and may be added by squaring each part which is known as non-coherent integration. Compared to non-coherent integration, coherent integration provides better results for the same integration length. To boost the weak signal power, long time integration is necessary. However, with the extension of integration time, the requirement of low residual carrier frequency becomes stricter for coherent integration. Furthermore, in many cases the receiver processor may not be able to meet the computational requirements of coherent integration.

Different navigational signals use different kinds of modulations. GPS $L_1$ signal is a code division multiple access (CDMA) signal, which uses direct sequence to bi-phase modulate the carrier. Two kinds of codes are used for CDMA modulation. They are C/A code and P(Y) code. The C/A code modulated signal in the $L_1$ frequency is the principal civilian ranging signal. One-millisecond correlation with corresponding pseudo-random noise (PRN) sequence is used for C/A code demodulation. In addition to the C/A codes, the GPS signal is also modulated with 50 bits/second data by bi-phase shift key (BPSK) modulation. Bit 1 corresponds to 0° phase shift while bit 0 corresponds to 180° phase shift. These data contain ephemeris, almanac, corrections etc., which describe satellite locations, health information, and the correction necessary to the space-borne clock. Without this information, correct user position and time can not be determined. So it is necessary to demodulate these data from received satellites ranging signals correctly. Further, when coherent integration time is longer than one data bit duration (20 milliseconds), which is required for weak signals, the signal sign inversion due to these data bits must be removed. So the knowledge of the data bit boundary is required. This data bit boundary is characterized by the change in the polarity of the one-millisecond correlation values over a length of 20 milliseconds or integer multiple of that interval. This reversal of the polarity of correlation values is the basis for estimating the edge of the data bit or more specifically bit transitions in the navigation signal.

As an aid to detection and demodulation of the data, a Frequency Lock Loop (FLL) is used to bring down the residual carrier frequency to a very low value. Further, a suitable length FFT computes this residual frequency. But under weak signal reception conditions, a long integration is employed. It is necessary to compensate for the variation in phase of successive one millisecond samples. A phase lock loop (PPL) may be used to further refine the above compensation. This will also improve the PVT (Position, Velocity and Time) values computed by the navigation engine of the GPS receiver. However, the PLL looses lock under dynamics and not usable under dynamic environment. On the other hand, the FLL is more stable but not accurate. There are some prior art solutions to address this problem. U.S. Pat. No. 507,731 discloses a PLL circuit which is updated by the estimated center frequency of a received signal based on an FFT. In U.S. Pat. Nos. 6,181,258 and 6,163,276, banks of PLLs are connected to the FFT output in a multi-frequency communication system. For more accurate determination of the residual frequency, a long FFT needs to be computed and for this purpose a sliding window technique has been reported in published US patent application 20050043887 but this refers to frequency estimation and not to the data polarity. Further, a weighted average of the frequency estimate is disclosed in published US patent application 20050063487.

Accordingly, there is a need for a robust PLL tracking scheme which also takes into account the Doppler rate of change and which can be used to determine the polarity or sign of navigation data bits of a received signal.

SUMMARY

Fast Fourier transform (FFT) based phase lock loops (PLLs) are provided for use in navigational signal receivers, which take into account the Doppler rate of change and which can be used to determine the polarity or sign of navigation data bits of a received signal.

In an embodiment, a navigation receiver correlates a received navigational signal with a locally generated signal to obtain correlation samples, one-millisecond correlation samples, which may be integrated to acquire the signal under weak signal conditions. The navigational receiver includes a FFT based PLL that corrects for phase shifts in the correlation samples due to the Doppler frequency by considering both the Doppler frequency and its rate of change, which are obtained from a FFT computation with interpolation. The phase corrected correlation samples are then integrated over the length of a navigation data bit, e.g., 20 milliseconds, to determine the polarity or sign of the data bit of the received signal.

In an embodiment, the PLL computes a phase for each correlation sample as the sum of an integration or summation of the Doppler frequency and a double integration or double summation of its rate of change, both with respect to time. The computed phase is then added with a prior residual phase to obtain a phase correction for the respective sample. The phase corrected samples are then coherently integrated or summed over the length of a data bit, e.g., 20 milliseconds, for both in-phase (I) and quadrature (Q) components of the received signal. The quality of signal tracking is then determined by a tracking indicator based on the relative value of the integrated I value with respect to the integrated Q value. If the tracking quality is good, then the polarity of the data bit is taken as the polarity or sign of the integrated I value.

In another embodiment, a soft decision feedback technique is used to determine the sign of a data bit of the received signal. The soft decision feedback involves integration over several prior data bits with the present data bit. In this embodiment, an integration value over the present data bit is multiplied with a weighting factor based on the tracking indicator of the previous embodiment. The multiplication result is then added to integration values extending over several prior data bits to determine the polarity or sign of the present data bit. The soft decision feedback improves the tracking signal-to-noise ration (SNR) when the integration period is higher than the length of one data bit. Thus, the soft decision uses a moving window technique involving several known prior data bits to determine the sign of the present data bit.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

FIG. 1 is a block diagram illustrating the baseband architecture of a GPS receiver according to an embodiment of the invention.

FIG. 2 is a block diagram illustrating a fast Fourier transform (FFT) based phase lock loop (PLL) tracking loop according to an embodiment of the invention.

FIG. 3 illustrates sliding window operations according to an embodiment of the invention.

FIG. 4 is a block diagram illustrating a soft decision feedback with moving window according to an embodiment.

DETAILED DESCRIPTION

FIG. 1 illustrates a receiver according to an embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency. The I and Q signals 107 and 108 may be low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the channel being processed by the baseband section at that time. The PRN sequence generator is driven by code NCO 112. The local code generator frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The processor 113 receives one millisecond integrated (correlated) I and Q values from the GPS baseband section described above. In order to acquire a GPS signal in the processor 113, all dwells (set of carrier frequency, code offset) are searched. This is a two-dimensional search. Coherent integration and non-coherent integration are two commonly used correlation methods to acquire GPS signals. Coherent integration provides better signal gain at the cost of larger computational load, for equal integration times.

Because of the different phase shifts associated with each succeeding one millisecond correlation value or sample from the baseband processor, a resulting residual modulation frequency or phase shift has to be removed to perform correct coherent integration. The phase shift occurs because of the ever changing Doppler frequency of the satellite signals at the receiver. The phase shift cannot be corrected by the DDFS because of the finite response time of the processor 113 and the correction can be applied only to the later samples.

If the residual carrier has some integral number of cycles, a frequency lock loop (FLL) is used to bring down this frequency to nearly zero cycle. For this purpose an FFT based estimation of this carrier frequency is made based on a set of one-millisecond correlation values.

In an embodiment of the invention, a group of succeeding one-millisecond correlation samples is considered for phase correction. For example, the group may consist of M*20 samples where M is the number of the data bits in the group, and each data bit corresponds to 20 one-millisecond samples. A fast Fourier transform (FFT) of, e.g., the first 16 samples of this group is computed. FFT requires less computational load when its length is $2^n$, where n is an integer. In this example, $2^4=16$ samples, which is less than 20 and is therefore used.

From the results of the FFT computation, the peak frequency component value is estimated using a quadratic interpolation. Alternatively, a higher order polynomial interpolation may be used. The peak interpolation involves drawing a second order curve over the computed maximum and the adjacent components. The peak point on this curve represents the actual residual frequency and is denoted here as $fd_{new}$. The residual frequency of the previous set of M*20 samples is $fd_{old}$, which may be computed the same way as $fd_{new}$. By knowing the values of these two frequencies and the time duration of the integration window, the rate of change of the Doppler frequency can be estimated as shown below Rate of change of Doppler=$\alpha=(fd_{new}-fd_{old})$/(window time duration).

In this particular example the window time duration=M*20 milliseconds.

FIG. 2 is a block diagram illustrating a FFT based PLL tracking loop 200 according to an embodiment of the invention. The FFT based PLL tracking loop 200 may be implemented as software in the processor 113. When tracking of the signal starts after a successful acquisition, a set of M*20 one-millisecond correlation values or samples are collected. As explained above, an FFT of the first, e.g., 16 samples is computed and the $fd_{new}$ and $\alpha$ are determined. This is shown as the block 202. The integration of the frequency $fd_{new}$ gives the phase change due to the Doppler frequency and a double integration of $\alpha$ gives the phase change due to rate of change of the Doppler frequency. Further, the phase of each one-millisecond sample is different, exhibiting a gradual increase or decrease in phase shift from the previous sample. The phase of the present sample is the sum of the old phase and the phase due to the new Doppler frequency and the rate of the Doppler frequency variation. If i represents the time index of the one-millisecond sample under consideration, $phi_{old}$ is the phase of the sample prior to the present set of M*20 samples, and $fd_{new}$ is the Doppler frequency at the first sample and $\alpha$ is the rate of change of the Doppler frequency with time, then $Phi_{new}$ which is the present phase of the $i^{th}$ sample may be given as $$Phi_{new}=phi_{old}fd_{new}*2*\pi*i+alpha*i*i*\pi \quad (1)$$

where i has a value ranging from 1 to (M*20) ms and represents the time increase of one millisecond from sample to sample. The phase $phi_{old}$ may be computed from the previous set of M*20 samples in block 205, as explained below.

The $Phi_{new}$ computed as in equation is used to rotate the phase of each sample i. The number of phase rotated samples in this way is M*20. This phase rotation or correction is shown as block 203.

A coherent sum or integration of 20 samples representing samples of 20 milliseconds is obtained. This summation is carried out for both I and Q components. If i and q represent phase corrected one-millisecond samples and $I_n$ and $Q_n$ represent the summation of 20 one-millisecond samples, then the summation can be represented as $$(I_n,Q_n)=SUM(i,q) \quad (2)$$

where n is an index of the 20 millisecond samples in the set of M*20 millisecond samples and ranges from 1 to M. This summation is shown as block 203. Since in tracking the edge of the navigation data bit is known to coincide with the first one-millisecond sample, a high $I_n$ with low value of $Q_n$ indicates good tracking and the sign of the corresponding data bit is the same as that of the $I_n$. On the other hand, a low $I_n$ with high value of $Q_n$ indicates that the tracking is not good. A phase lock loop (PLL) lock detector (LockDetector) is defined by Equation (3) below. The quality of tracking is determined based on the value of LockDetector and when the tracking quality is good, the polarity or sign of the data bit is determined.

$$LockDetector = \begin{cases} 1-(2/\pi)*\arctan(|Q_n/I_n|) & \text{when } I_n \neq 0 \\ 0 & \text{when } I_n = 0 \end{cases} \quad (3)$$

The LockDetector is shown as block 204. If the LockDetector value is close to one, i.e., $|Q_n| \ll |I_n|$, then tracking is good and the sign of $I_n$ can be regarded as the sign of that data bit. On the other hand, if the LockDetector value is less than 0.5, $|Q_n| > |I_n|$ and tracking is not good. The threshold value for good tracking may different than 0.5, e.g., 0.9. In the case of $I_n=0$, tracking is extremely poor.

Once the tracking is good and data bit polarity or sign has been determined, all of the 20 millisecond I and Q samples in the set of M*20 millisecond samples are added to get I and Q for the integration length as shown below $$I = I_1 + I_2 + I_3 + \ldots I_M$$

$$Q = Q_1 + Q_2 + Q_3 + \ldots Q_M$$

The phase error over the integration window is $phi_{old}=\text{Arctangent}(Q/I)$. This $phi_{old}$ is used as the initial phase of the next integration window. Thus this $phi_{old}$ is used as the initial phase of the next set of M*20 samples. The phase error calculation is shown as block 205.

In the final block 206, the update of the DDFS and code NCO is carried out. The cycle then repeats with the next set of M*20 samples.

In another embodiment, the FFT is computed by considering the first 16 samples of each 20 sample. Thus the residual frequency is determined for each of the 20 consecutive samples by the FFT and quadratic interpolation. The associated 20 samples are phase rotated as in the previous embodiment. Thus instead of computing the FFT only at the beginning of the window period, the FFTs are computed for every 20 samples. The associated phase correction is also done for these 20 samples. Thus this embodiment requires more computation power but provides better phase compensation of the samples than can be expected when phase change is not smooth over the window interval. The phase change is not smooth because of the possible random velocity of the receiver platform.

In yet another embodiment of the implementation, the residual frequency may be computed only for some of the 20 millisecond samples in the integration window. The number of the FFTs selected may depend upon the computational load that can be handled by the system.

When the received signals are very weak, a long integration is required. This may be done by associating samples of a later part of the previous integration window with the present window. Thus if the integration window has M*20 samples, then M/2*20 samples may be from the previous window and the remaining M/2*20 samples may be new samples. However, this ratio of the old samples to the new samples may be variable. Further, the size of the integration window may be a function of the navigational satellite signal strength with a larger window size for lower signal strengths. FIG. 3 illustrates the operation of a sliding window according to an embodiment. The block 301 represents a function "Op A" which includes performing FFT and determining the Doppler rate and spans the entire integration window of M*20 samples. The block 302 represents function "Op B" which includes the phase correction of the samples, coherent sum, tracking detection data decode, soft decision feedback and frequency correction for DDFS. These operations are carried out only on the new M/2*20 samples. Block 303 represents the function "Op A" for the succeeding integration window and uses M/2*20 samples from the previous window and M/2*20 new samples. Block 304 represents the function "Op B" for the succeeding integration and uses M/2*20 new samples.

The sliding window provides faster update. For example, if M=50, then update can occur at every 25*20 milliseconds or 0.5 seconds using a window of 50*20 milliseconds or 1 second. This higher update rate provides better PVT (Position, Velocity and Time) precision and carrier frequency update. If a higher update rate is required, then the sliding ratio may be made higher by using a larger number of old correlation samples with respect to the new samples. Thus by selecting M*3/4 old samples with M*1/4 new samples, the update rate may be doubled with update occurring at every 0.25 seconds for the case of M=50. Further, when the signals are very weak, a long integration is required and this may be accomplished by having a larger number of old samples with a smaller number of new samples.

As described above the data bit sign is determined based on the value of I with respect to Q. Thus a hard decision is made on the sign of the data bit without considering the relative value of I with respect Q under the condition $I \gg Q$. However, instead a soft decision approach may be used to determine the sign of the data bit. FIG. 4 illustrates a soft decision scheme according to an embodiment. The soft decision in this embodiment involves considering both I and Q values over an integration length of 20 milliseconds. Reference number 401 represents the present 20 millisecond integration result represented as x(n). Block 402 selects the data bit sign and uses both +1 and −1 sign. Reference number 403 represents a weighting factor w or residual phase error of 20 millisecond. The weighting factor w may be the same as the LockDetector value given in Equation (3) above for I and Q for a duration of 20 milliseconds. The three parameters of the 20 millisecond integrated value x(n), the sign (+1 or −1) and the weighting factor w are multiplied together by multiplier 404. The result of the multiplication is then added by adder 407 with previous 20 millisecond integration values in delay blocks 405, 406, . . . up to (M−1) values. The previous values represented by blocks 405, 406, . . . have been corrected for the correct sign. Reference number 408 represents the output of adder 407 also indicated as y(n). The value y(n) is obtained for both possible signs of x(n). In other words, the value of y(n) is determined for both the +1 and −1 sign. The sign of x(n) which results in a higher value for y(n) is taken as the correct sign.

The sign of the previous values in blocks 405, 406, . . . may be determined using the same technique as above or, if the signal is strong for the previous values, using other methods without long integration.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

What is claimed is:

1. A method for tracking satellite signals at a satellite navigational receiver, wherein the receiver correlates a received satellite signal with a local signal into correlation samples, comprising:

computing a Doppler frequency and a rate of change of the Doppler frequency;

computing a phase for each correlation sample based on the computed Doppler frequency and the computed rate of change of the Doppler frequency;

compensating for a phase shift of each sample with the computed phase for the respective sample;

coherently integrating the phase compensated samples over the length of one or more data bit for an in-phase (I) component to obtain an I value;

coherently integrating the phase compensated samples over the length of one or more data bit for a quadrature (Q) component to obtain a Q value;

determining a sign of each data bit of the received signal based on a relative value of the I value with respect to the Q value; and determining a quality of tracking value based on the relative value of the I value with respect to the Q value.

2. The method of claim 1, wherein the computed phase for each sample comprises a sum of contributions from a prior phase, the Doppler frequency, and the rate of change of the Doppler frequency.

3. The method of claim 1, wherein the rate of change of the Doppler frequency is computed by a difference between the computed Doppler frequency and a prior Doppler frequency divided by a time duration.

4. The method of claim 1, wherein the length of one data bit is about 20 milliseconds.

5. The method of claim 1, further comprising determining the sign of the data bit based on a sign of the I value if the quality of tracking value is greater than a threshold value.

6. The method of claim 1, further comprising using a soft decision feedback weighting factor based on the quality of tracking value to determine the sign of the data bit.

7. The method of claim 1, wherein computing the Doppler frequency comprises:

computing a Fast Fourier Transfom (FFT) of several of the samples; and locating a peak power frequency component of the FFT using a quadratic or higher order polynomial interpolation.

8. The method of claim 7, wherein the FFT is computed using a sliding integration window, wherein a present sliding integration window comprises a plurality of known old samples from a prior sliding integration window and at least one new sample, and has a sliding ratio of old samples to new samples.

9. The method of claim 8, wherein a size of the sliding integration window is a function of a satellite signal strength.

10. The method of claim 8, wherein the sliding ratio of old samples to new samples of the sliding integration window is variable.

11. The method of claim 8, wherein the sliding ratio of old samples to new samples of the sliding integration window depends upon Position, Velocity and Time (PVT) and frequency update requirements.

12. The method of claim 11, vherein the sliding ratio of old samples to new samples of the sliding integration window is increased if higher PVT update rate is required.

13. A navigational satellite receiver, comprising:

a radio frequency front-end for receiving satellite signals;

a baseband section for processing the received signals into correlation samples; and a processor coupled to the baseband section, wherein the processor computes a Doppler frequency and a rate of change of the Doppler frequency, computes a phase for each correlation sample based on the computed Doppler frequency and the computed rate of change of the Doppler frequency, compensates for a phase shift of each sample with the computed phase for the respective sample, coherently integrates the phase compensated samples over the length of one or more data bit for an in-phase (I) component to obtain an I value, coherently integrates the phase compensated samples over the length of one or more data bit for a quadrature (Q) component to obtain a Q value, determines a sign of each data bit of a received signal based on a relative value of the I value with respect to the value, and determines a quality of tracking value based on the relative value of the I value with respect to the Q value.

14. The navigational receiver of claim 13, wherein the computed phase for each sample comprises a sum of contributions from a prior phase, the computed Doppler frequency, and the computed rate of change of the Doppler frequency.

15. The navigational receiver of claim 13, wherein processor computes the rate of change of the Doppler frequency by a difference between the computed Doppler frequency and a prior Doppler frequency divided by a time duration.

16. The navigational receiver of claim 13, wherein the length of one data bit is about 20 milliseconds.

17. The navigational receiver of claim 13, wherein the processor determines the sign of the data bit based on a sign of the I value if the quality of tracking value is greater than a threshold value.

18. The navigational receiver of claim 13, wherein the processor uses a soft decision feedback weighting factor based on the quality of tracking value to determine the sign of the data bit.

19. The navigational receiver of claim 13, wherein the processor computes the Doppler frequency by computing a Fast Fourier Transform (FFT) of several of the samples, and locating a peak power frequency component of the FFT using a quadratic or higher order polynomial interpolation.

20. The navigational receiver of claim 19, wherein processor uses a sliding integration window to compute the FFT, wherein a present sliding integration window comprises a plurality of known old samples from a prior sliding integration window and at least one new sample, and has a sliding ratio of old samples to new samples.

21. The navigational receiver of claim 20, wherein a size of the sliding integration window is a function of a satellite signal strength.

22. The navigational receiver of claim 20, wherein the sliding ratio of old samples to new samples of the sliding integration window is variable.

23. The navigational receiver of claim 20, wherein the sliding ratio of old samples to new samples of the sliding integration window depends upon Position, Velocity and Time (PVT) and frequency update requirements.

24. The navigational receiver of claim 23, wherein the sliding ratio of old samples to new samples of the sliding integration window is increased if higher PVT update rate is required.

* * * * *